United States Patent
Froger et al.

(10) Patent No.: US 8,342,216 B2
(45) Date of Patent: Jan. 1, 2013

(54) VARIABLE FOOTPRINT FOR A PNEUMATIC TIRE

(75) Inventors: Nicolas Claude Jean-Claude Froger, Arlon (BE); Laurent Rene Nicolas Haas, Thionville (FR); Pierre Bernard Raoul Brochet, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 686 days.

(21) Appl. No.: 12/360,135

(22) Filed: Jan. 27, 2009

(65) Prior Publication Data

US 2010/0186865 A1   Jul. 29, 2010

(51) Int. Cl.
*B60C 5/00* (2006.01)
*B60C 19/00* (2006.01)

(52) U.S. Cl. ............ 152/454; 152/208; 152/209.14

(58) Field of Classification Search ........... 152/152.1, 152/209.1, 209.5, 245, 526, 531, 548, 208, 152/210, 209.14
See application file for complete search history.

(56) References Cited

U.S. PATENT DOCUMENTS

| | | | |
|---|---|---|---|
| 2,708,470 A | 5/1955 | Gramelspacher | 152/208 |
| 3,768,532 A * | 10/1973 | Arai | 152/151 |
| 4,570,691 A | 2/1986 | Martus | 152/332.1 |
| 5,174,214 A | 12/1992 | Oda et al. | 104/282 |
| 6,564,839 B1 | 5/2003 | Manne et al. | 152/209.14 |
| 7,066,226 B1 * | 6/2006 | Fiore | 152/208 |
| 2003/0159503 A1* | 8/2003 | Mancuso et al. | 73/146 |
| 2004/0250934 A1* | 12/2004 | Hamdan | 152/208 |

FOREIGN PATENT DOCUMENTS

JP   62251207 A  * 11/1987
KR     534878   * 12/2005

OTHER PUBLICATIONS

Derwent abstract of KR534878, 2005.*

* cited by examiner

*Primary Examiner* — Justin Fischer
*Assistant Examiner* — Philip N Schwartz
(74) *Attorney, Agent, or Firm* — Robert N. Lipcsik

(57) ABSTRACT

An assembly adjusts functional characteristics of the assembly. The assembly includes a wheel for a vehicle, a pneumatic tire mounted on the wheel, a first electromagnetic structure attached to the pneumatic tire, and a second electromagnetic structure attached to the wheel. The assembly has a first condition characterized by the first and second electromagnetic structures being not energized and a second condition characterized by the first and second electromagnetic structures being energized. The first condition is characterized by a first footprint of the pneumatic tire with a shape different than a shape of a second footprint of the pneumatic tire in the second condition.

8 Claims, 6 Drawing Sheets

VARIABLE FOOTPRINT FOR A PNEUMATIC TIRE

FIELD OF THE INVENTION

The present invention relates to a pneumatic tire for a vehicle and, more particularly, to a pneumatic tire having two modes of operation, each generating a footprint with varied characteristics.

BACKGROUND OF THE INVENTION

To cope with the global demand for energy efficiencies in the transportation industry, various approaches have been employed in order to vary characteristics of pneumatic tires under different operating conditions (i.e., reduction of the rolling resistance of a pneumatic tire in an attempt to decrease the specific rate of hydrocarbon-based fuel consumption of the corresponding automobile or truck). The rolling resistance of a tire can effectively be reduced by diminishing the internal friction loss caused by a deformation of a tire during running. A known measure for diminishing the internal friction loss is to use higher density rubber materials in tire construction having a characteristic of a smaller internal friction loss comprising the material of the cap tread of the tire.

The low level of the internal friction loss of the above mentioned rubber material, however, seriously affects general characteristics of the tire such as braking performance, steering performance, comfort, wear-resistant properties and so forth. For instance, if a more dense rubber having a small internal friction loss is used to reduce the rolling resistance of the tire during running, various unfavorable phenomena are caused during high-speed cruising on a wet road, such as an increase of braking distance, decrease in aquaplaning, deterioration of control, degraded comfort, reduced wear, and so on. These characteristics are typically undesirable for a pneumatic tire.

Conventionally, a cap tread of a pneumatic tire has been constituted by a rubber compound which inherently has a large internal friction loss in order to improve the above-mentioned characteristics of the pneumatic tire, such as braking distance. The attempt to reduce the rolling resistance and aquaplaning of the pneumatic tire by diminishing the internal friction loss, therefore, is inevitably accompanied by a certain degradation of desirable tire characteristics. Henceforth, there has existed a conflicting design tradeoff in the conventional construction and design of a pneumatic tire that limits both the performance characteristics and the extent of fuel efficiency.

One conventional pneumatic tire attempts to supercede these design limitations by providing a moveable tread portion to produce a variable ground contact footprint. This conventional pneumatic tire claims to improve wet grip performance without affecting dry grip performance, while also decreasing rolling resistance.

More specifically, this conventional pneumatic has two tread portions. One tread portion tread is constructed to remain in contact with a road surface and the other is constructed to optionally be in contact with the road surface or withdrawn from contact with the road surface before, during or after operation. The non-moveable tread portion is located near each shoulder of the pneumatic tire. The moveable tread portion is centered near the equatorial plane of the pneumatic tire and is selectively moveable in a radial direction of the pneumatic tire toward or away from contact with the road surface.

The moveable tread portion is constructed of a rubber material having relatively high friction loss and low elastic modulus. When the moveable tread portion is in contact with the road surface, rolling resistance is increased, but braking distance is decreased. The moveable tread portion of this conventional pneumatic tire has expandable voids located underneath the tread surface and within the crown of the pneumatic tire. These voids are in communication with sources of a pressure source and can be made to increase or decrease in volume. When pressurized, the voids expand and the moveable tread portion contacts the road surface. When depressurized, the voids contract and the moveable tread portion withdraws from contact with the road surface.

When low rolling resistance is desired and braking is not anticipated, the moveable portion of the tread is withdrawn from the road surface. The moveable tread portion is normally withdrawn from contact with the road surface when the vehicle is cruising at highway speeds and low rolling resistance is desired. In this condition, the weight of the vehicle is placed on the now smaller ground-contact patch of the footprint surface area. Thus, the ground-contact footprint offers less contact friction and the average rolling resistance is reduced. Also, the tendency of the pneumatic tire to aquaplane is reduced.

When acceleration or deceleration (i.e., braking) is desired or anticipated, the voids of the conventional pneumatic tire are expanded and the moveable tread portion contacts the road surface. The friction offered by the larger ground-contact footprint creates additional braking/traction capability. A pneumatic tire having dual modes of enhanced traction and decreased aquaplaning, without requiring a costly dedicated and complex tire construction such as the conventional pneumatic tire described above, would be desirable.

DEFINITIONS

"Bead" means that part of the tire comprising an annular tensile member wrapped by ply cords and shaped to fit the design rim.

"Carcass" means the tire structure apart from the belt structure, tread, undertread, and sidewall rubber over the plies, but including the beads.

"Ground Contact Patch" refers to a section of footprint, in a footprint that is divided into sections by wide void areas, that maintains contact with the ground during operation.

"Crown" refers to the circumferentially outermost portion of the carcass substantially within the width limits of and including the tread.

"Equatorial Plane (EP)" means the plane perpendicular to the tire's axis of rotation and passing through the center of its tread.

"Footprint" means the maximum ground contact patch or area of contact of the tire tread with a flat surface at zero speed and under design load and pressure.

"Groove" means an elongated void area in a tread that may extend circumferentially or laterally about the tread in a straight, curved, or zig-zag manner. Grooves ordinarily remain open in the tire footprint. Grooves may be of varying depths in a tire.

"Operation" means prior to, during, or after the running or movement of the vehicle.

"Pneumatic Tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "Radially" are used to mean directions radially toward or away from the axis of rotation of the tire.

"Shoulder" refers to the upper portion of sidewall just below the tread edge. "Sidewall" means that component which comprises a portion of the outside surface of a tire between the tread and the bead.

"Tread" means a molded rubber component which, when bonded to a tire casing, includes that portion of the tire that comes into contact with the road when the tire is normally inflated and under normal load.

"Tread Width" means the arc length of the road contacting tread surface in the axial direction, that is, in a plane parallel to the axis of rotation of the tire.

SUMMARY OF THE INVENTION

An assembly in accordance with the present invention adjusts functional characteristics of the assembly. The assembly includes a wheel for a vehicle, a pneumatic tire mounted on the wheel, a first electromagnetic structure attached to the pneumatic tire, and a second electromagnetic structure attached to the wheel. The assembly has a first condition characterized by the first and second electromagnetic structures being not energized and a second condition characterized by the first and second electromagnetic structures being energized. The first condition is characterized by a first footprint of the pneumatic tire with a shape different than a shape of a second footprint of the pneumatic tire in the second condition.

According to another aspect of the present invention, the first electromagnetic structure is a metallic block and the second electromagnetic structure is an electromagnet.

According to still another aspect of the present invention, the metallic block is attracted to the electromagnet when the electromagnet is energized.

According to yet another aspect of the present invention, the first electromagnetic structure is an electromagnet and the second electromagnetic structure is a metallic block and the metallic block is attracted to the electromagnet when the electromagnet is energized.

According to still another aspect of the present invention, the metallic block is repelled by the electromagnet when the electromagnet is energized.

According to yet another aspect of the present invention, the first electromagnetic structure is a metallic ring having a rectangular cross-section and the second electromagnetic structure is an electromagnetic ring having a rectangular cross-section.

According to still another aspect of the present invention, the metallic ring and the electromagnetic ring are both define continuous rings.

According to yet another aspect of the present invention, the metallic ring is defined by a plurality of blocks spaced about the wheel to form a circular configuration.

According to still another aspect of the present invention, the electromagnetic ring is defined by a plurality of blocks spaced about the wheel to form a circular configuration.

BRIEF DESCRIPTION OF THE DRAWINGS

The invention will be described by way of example and with reference to the accompanying drawings in which.

DETAILED DESCRIPTION OF AN EXAMPLE EMBODIMENT

A conventional standard pneumatic tire has circumferential grooves and a ground contact-patch that is nearly constant in area during operation. With this limitation, it becomes difficult to satisfy requirements to enhance the performance of the tire, such as road grip performance in wet conditions, steering stability during cornering, and improved fuel consumption (i.e., lower rolling resistance).

Thus, an optimum compromise between tire rolling resistance—which ideally is reduced to the minimum—and characteristics of handling and comfort of the tire is sought. This objective is particularly difficult to achieve due to the constraint of a nearly constant ground-contact footprint area. Conventional attempts to increase fuel efficiency usually center on changes in material composition or the construction of the tire. Typically, a reduction of rolling resistance is obtained by a higher density tread material or stronger body or ply cords of the carcass of the tire.

One example tire utilizes multiple modulus body cords to reduce rolling resistance. Another example tire utilizes varying chemical components of the tire construction to reduce fuel consumption. Still another example tire claims a low-rolling resistance tire having an improved belt structure.

Yet another example tire utilizes a variable ground-contact footprint area obtained by withdrawing a portion of the tread of a tire radially inward from the road surface, when desired by a driver. Such a tire claims low rolling resistance and low aquaplaning when the portion of the tread is withdrawn and low braking distance when the portion of the tread is in contact with the contact surface (i.e., the road). This tire thereby has two modes of operation, and a distinct footprint in each mode.

Figure 1:
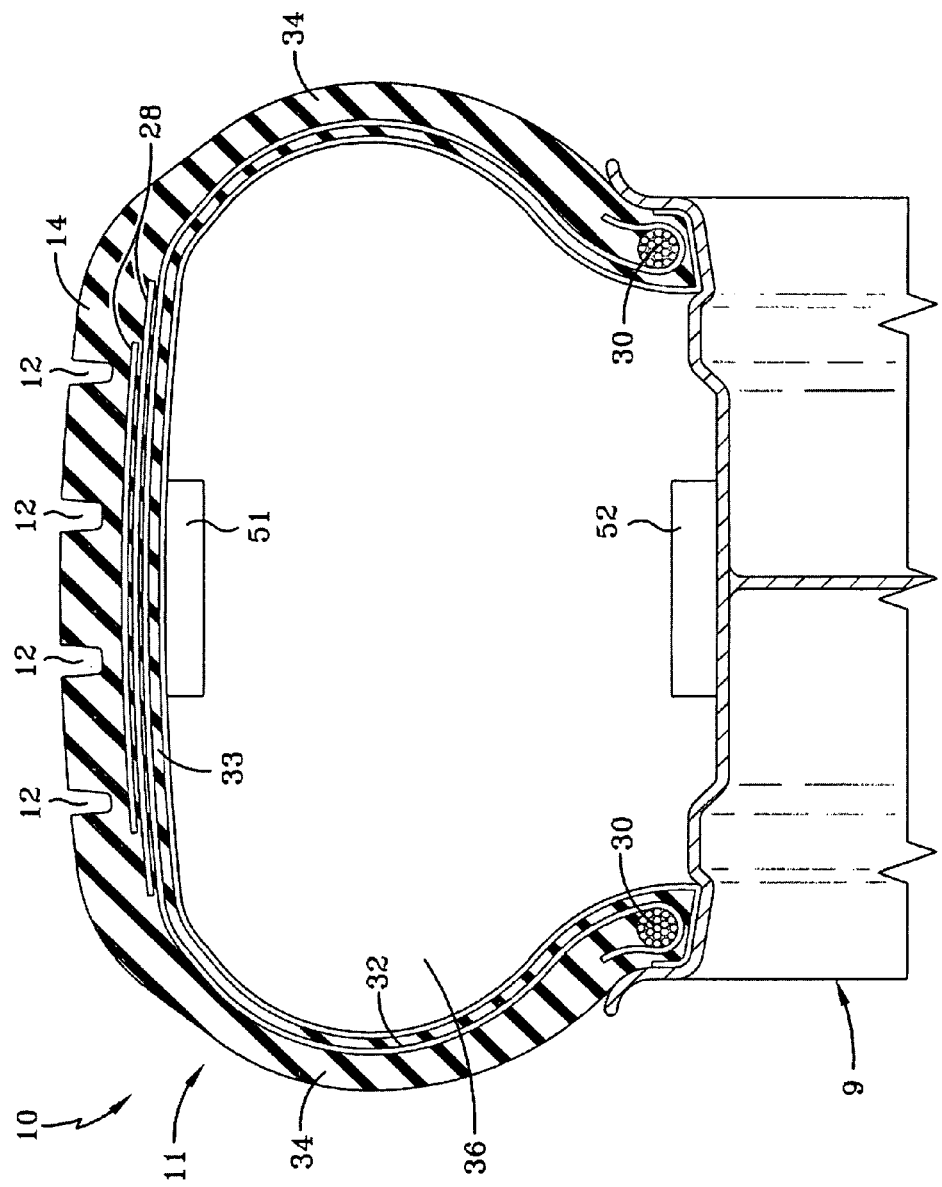
FIG. 1 is a schematic cross sectional view of a pneumatic tire/wheel assembly in accordance with the present invention.

An example pneumatic tire and wheel assembly 10 in accordance with the present invention, as shown in FIG. 1, includes a pneumatic tire 11 and a wheel 9, each being centered on an equatorial plane of the tire/wheel assembly. The tire 11 includes circumferential grooves 12, a tread portion 14, belt plies 28, a pair of inextensible beads 30, a carcass ply 32, and sidewall portions 34.

The assembly 10 further includes a pair of electromagnetic structures 51, 52, each being symmetrically arranged about the equatorial plane of the assembly. The first electromagnetic structure 51 may be attached to a radially inner portion 33 of the tire 11, underneath the tread portion 14, belt plies 28, and the carcass ply 32, within the air chamber 36 defined by the cavity shape of the tire. The first structure may 51 be a metallic block having an annular or ring configuration and a rectangular cross-section (FIGS. 1 & 3) attached underneath, and radially inward of, the carcass ply 32. Further, the first structure 51 may be a continuous ring or a plurality of metallic blocks defining a ring of elements spaced equally about the radial inner portion 33 of the tire 11. Any shape or configuration may be suitable, as long as the first structure 51 deforms the cavity of the pneumatic tire 11 in a suitably uniform manner about the tread portion 14 of the pneumatic tire. The first "passive" electromagnetic structure 51 may alternatively be defined by metal belt plies 28 of the tire 11 itself.

Figure 3:
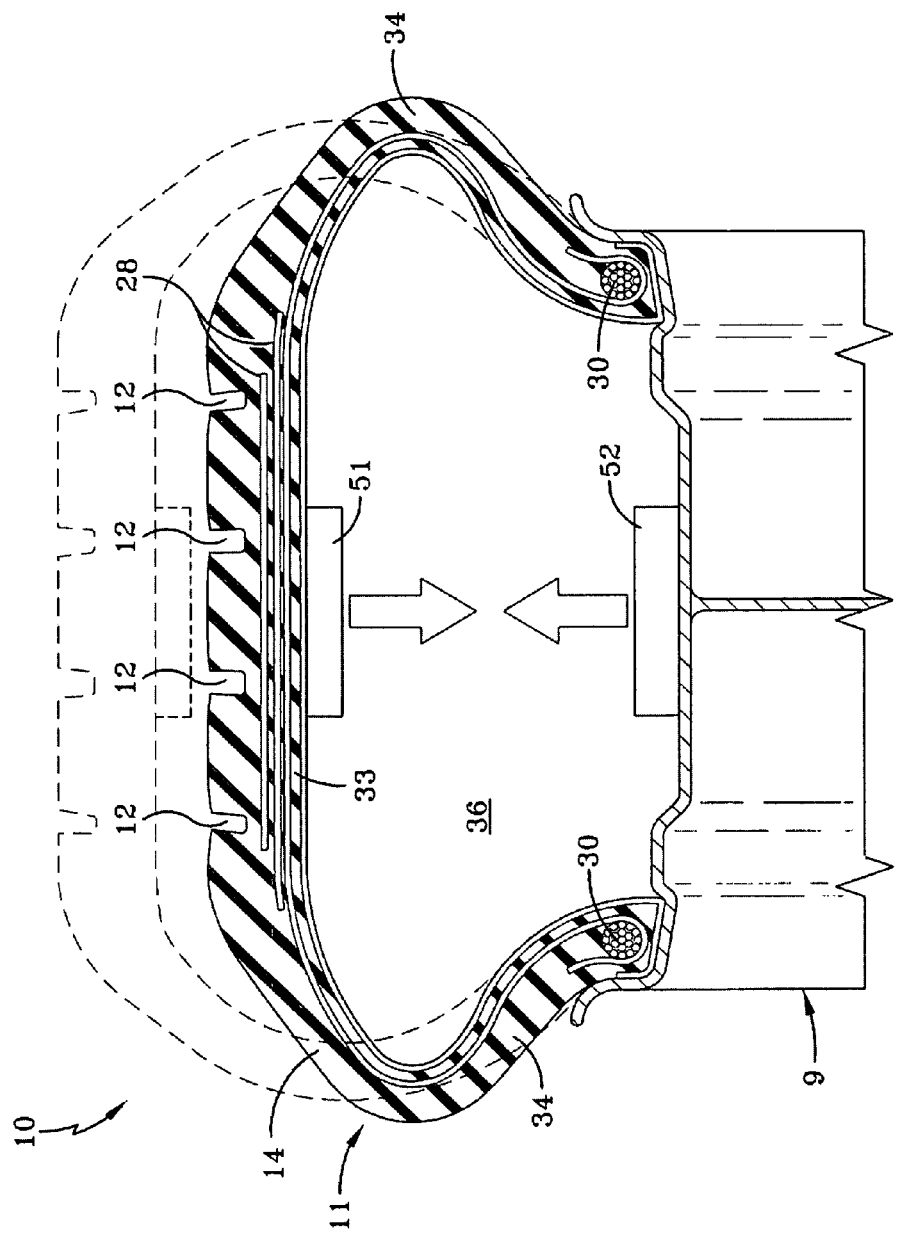
FIG. 3 is a schematic cross sectional view of the assembly of FIG. 1 in a second, different mode of operation.

The second electromagnetic structure 52 may be attached to an outer circumferential portion of the wheel 9, within the air chamber 36. The second structure may 52 be an electromagnet having an annular or ring configuration and a rectangular cross-section (FIGS. 1 & 3). Further, the second structure 52 may be a continuous ring or a plurality of blocks defining a ring spaced equally about the outer circumferential portion of the wheel 9. Any shape or configuration may be suitable, as long as the second structure 52 produces an electromagnetic field capable of affecting the first electromagnetic structure 51 in a suitably uniform manner about the tread portion 14 of the pneumatic tire 11 and enables the first structure to uniformly deform the cavity of the pneumatic tire 11. The second electromagnetic structure 52 may be selectively energized by any manner (not shown) suitable to produce an electromagnetic field of sufficient strength to selective attract and repel the first electromagnetic structure 51.

Figure 2:
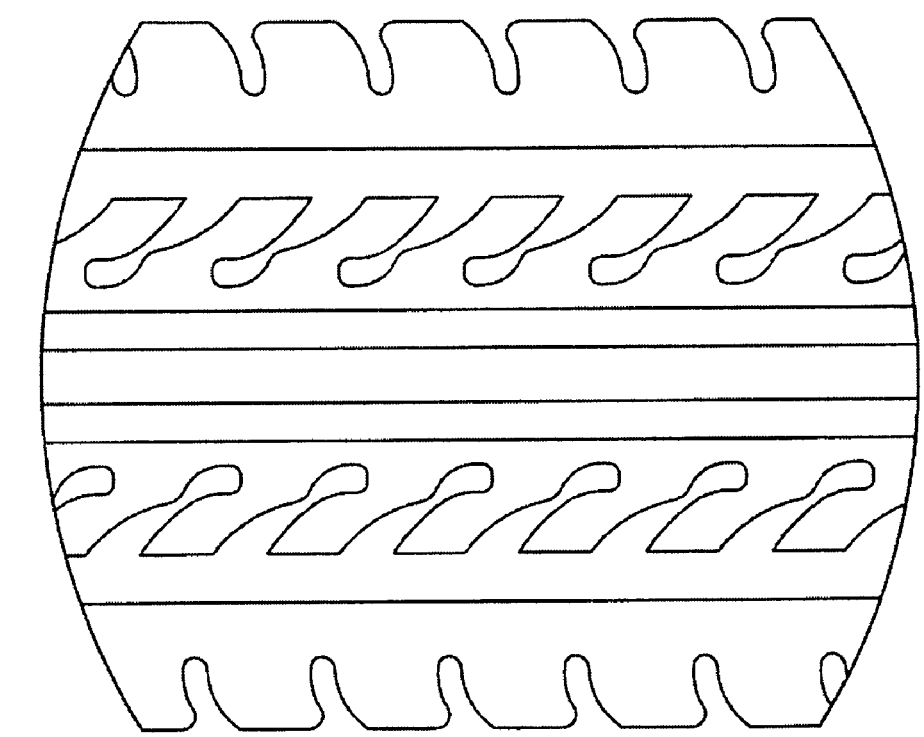
FIG. 2 is a schematic representation of an example footprint of the assembly of FIG. 1.

When the electromagnetic structures 51, 52 are not energized, the tire 11 has a normal, inactivated cavity shape as shown in FIG. 1 (a first, normal mode). FIG. 2 is a plan view representation of an example first footprint 202 of the tire 11 under this "de-energized" condition. Under this example condition, the tire 11 may have such a footprint 202 to produce a first normal rolling resistance and a first normal aquaplaning characteristic (i.e., normal contact patch area).

Figure 4:
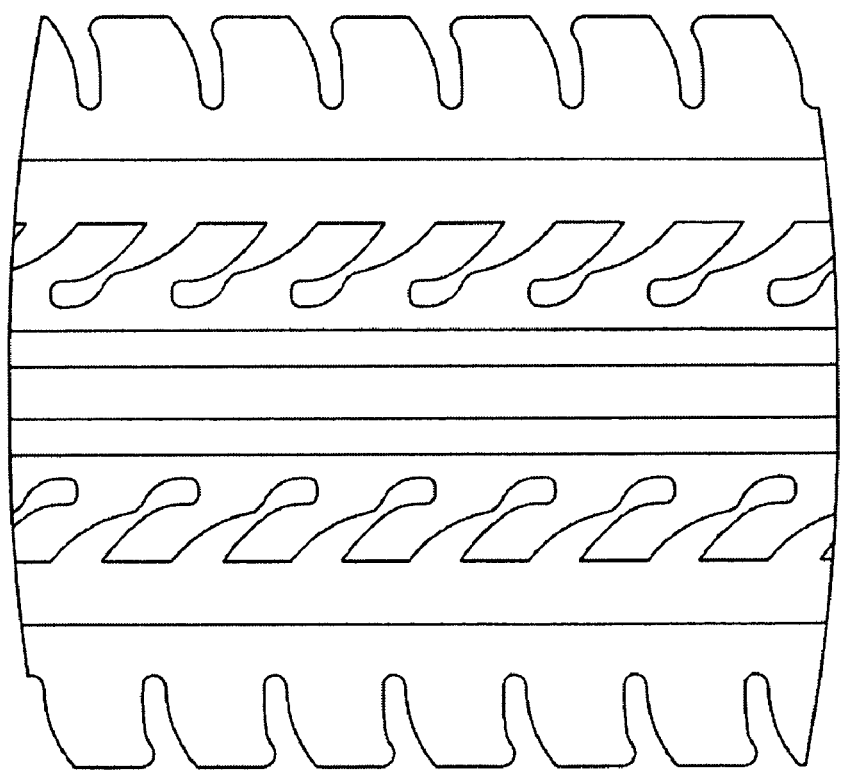
FIG. 4 is a schematic representation of an example footprint of the assembly of FIG. 3.

When the electromagnetic structures 51, 52 are energized in a manner to attract each other, the tire 11 has a cavity shape as shown in FIG. 3 (a second, attraction mode). FIG. 4 is a plan view representation of an example second footprint 404 of the tire 11 under this "energized" condition. Under this example condition, the tire 11 may have such a squarer footprint to produce shorter braking distance characteristics (i.e., more contact patch area) than the first, normal mode.

Figure 5:
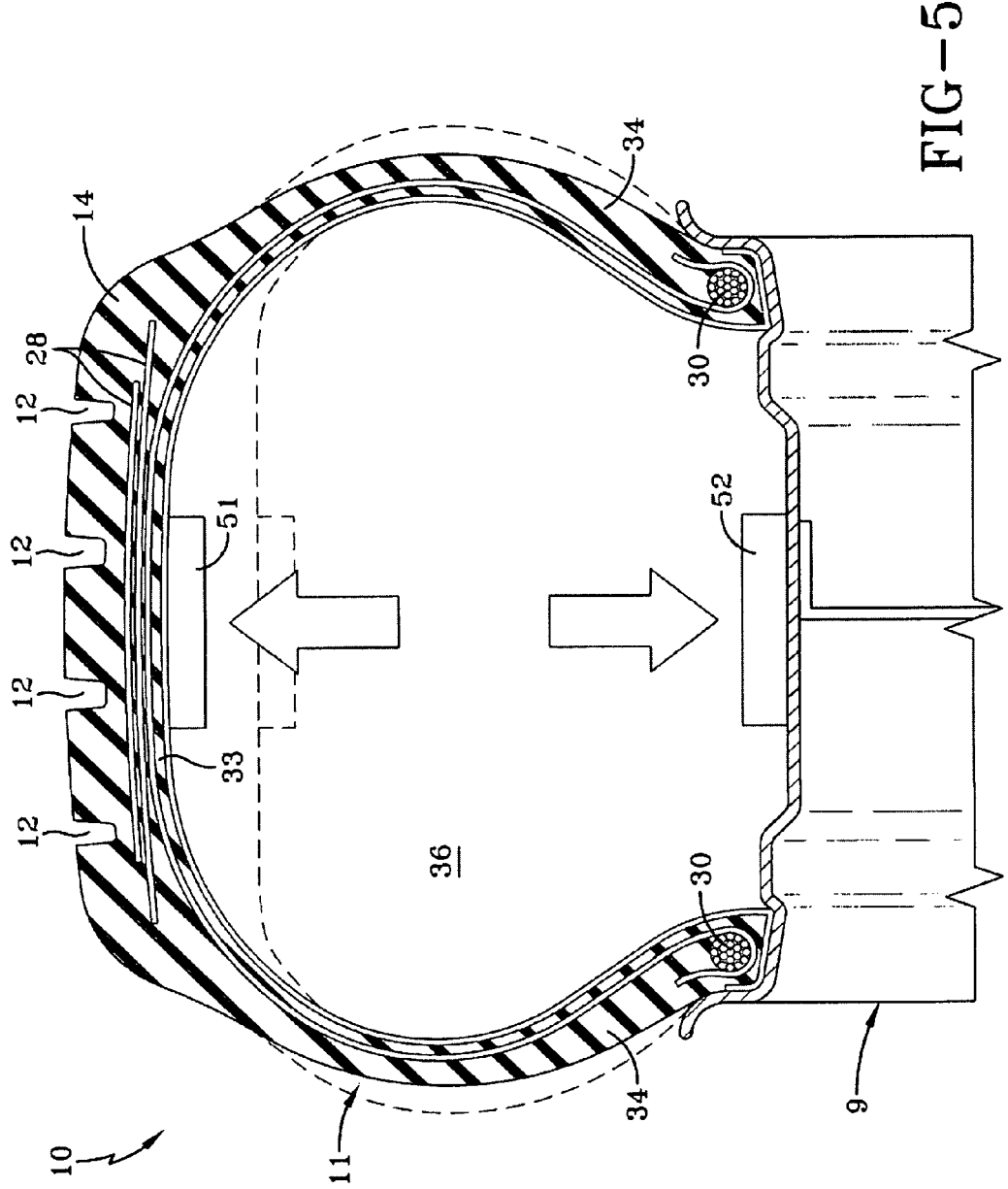
FIG. 5 is a schematic cross sectional view of the assembly of FIG. 1 in a third, different mode of operation.
Figure 6:
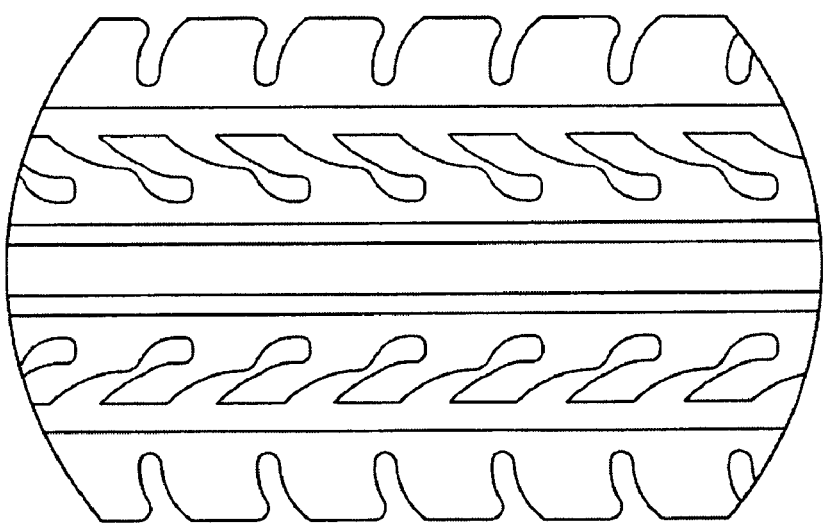
FIG. 6 is a schematic representation of an example footprint of the assembly of FIG. 5.

When the electromagnetic structures 51, 52 are energized in a manner to repel each other, the tire 11 has a cavity shape as shown in FIG. 5 (a third, repelling mode). FIG. 6 is a plan view representation of an example third footprint 606 of the tire 11 under this "energized" condition. Under this example condition, the tire 11 may have such a rounder footprint to produce more effective aquaplaning characteristics (i.e., less contact patch area) than the first, normal mode.

Alternatively, the first and second electromagnetic structures 51, 52 may be arranged and configured with only two modes, one normal mode and one "energized" mode to either attract or repel each other to produce the cavity shapes and footprints 202 & 404 or 606 in a "de-energized" condition and an "energized" condition, respectively. Further, the first electromagnetic structure 51 may be the energizable, electromagnet and the second electromagnetic structure 52 may be the passive, metallic block(s).

The assembly 10 in accordance with the present invention may be used with passenger, RV, light-truck, light-van, medium truck, heavy truck, aircraft, and/or any other type of pneumatic tire. Further, the electromagnetic structures 51, 52 may be transposed and/or operated to repel each other instead of attracting toward each other, as shown in the FIGS and described above.

Manual selection input (i.e., an operator switch) may direct the energizing of the structures 51, 52. However, a computerized control system may alternatively be implemented wherein sensors may detect forces and current operational requirements. The sensors may convey electronic signals regarding lateral and/or longitudinal acceleration forces, braking status, vehicle velocity, tire pressures, etc. into a microprocessor or other suitable electronic device. Software contained within the microprocessor may include a decision algorithm capable of deciding if the assembly 10 should be energized, for optimal braking, or energized, for optimal aquaplaning/rolling resistance, in order to meet requirements of a current or predicted operational scenario. An electronic signal may thereby be directed from the microprocessor to energize the structures 51, 52 accordingly.

For example, if an operator or the control system anticipates a requirement for enhanced braking (i.e., squarer footprint), the operator/control system will command the structures 51, 52 to be energized in the appropriate manner (the second mode of FIG. 3), thereby increasing contact with the road surface and improving braking and cornering characteristics over the normal mode of FIG. 1. If the operator or control system anticipates a requirement for enhanced fuel economy and/or decreased aquaplaning (i.e., round footprint), the operator/control system will command the structures 51, 52 to be energized in the appropriate manner (the third mode of FIG. 5), thereby decreasing contact with the road surface and decreasing aquaplaning characteristics over the normal mode of FIG. 1. Further, a digital signal from an anti-lock braking system may be used to monitor circumferential acceleration and braking requirements and be employed to energize/de-energize the structures 51, 52 to produce the first mode, the second mode, or the third mode as appropriate.

The assembly 10 in accordance with the present invention thus provides a Variable Tire Footprint (VTF). Depending upon the road/weather condition, the assembly 10 may be energized/activated to deform the cavity shape of the pneumatic tire 11 and thereby produce the tire footprint of FIG. 4 or FIG. 6. The pressure with the air chamber 36 may be maintained constant. The cavity shape alteration, not a pressure variation, creates the footprint change. The assembly 10 may be activated for shorter braking distance (FIG. 4) than normal (FIG. 2) or for better aquaplaning/rolling resistance performance (FIG. 6) than normal (FIG. 2), since the static/dynamic/road/wear performance of the assembly 10 and the vehicle is highly impacted by the shape of its footprint. For example, a wider tire footprint leads to shorter braking distance and a rounder tire footprint to reduced aquaplaning. An assembly 10 in accordance with the present invention may thus selectively improve vehicle performance characteristics on demand (i.e., a driver switch) or automatically (i.e., a microprocessor).

In the foregoing description, certain terms have been used for brevity, clearness, and understanding; however, no unnecessary limitations are to be implied therefrom beyond the requirement of the prior art, because such terms are used for descriptive purposes and are intended to be broadly construed. Moreover, the description and illustration of the disclosed invention is by way of example only, and the scope of the present invention is in no way limited to the exact details shown or described above. The scope of the present invention is limited and defined by the below claims.

What is claimed:

1. An assembly for adjusting functional characteristics of the assembly, the assembly comprising:
   a wheel for a vehicle;
   a pneumatic tire mounted on the wheel;
   a metallic block attached to the pneumatic tire; and
   an electromagnet attached to the wheel,
   the assembly having a first condition characterized by the metallic block and the electromagnet being not energized and a second condition characterized by the metallic block and the electromagnet being energized in a first manner such that the metallic block is attracted to the electromagnet when the electromagnet is energized, the first condition being characterized by a first footprint of the pneumatic tire with a shape different than a shape of a second footprint of the pneumatic tire in the second condition, the first condition being further characterized by the pneumatic tire having a first cavity shape, the second condition being further characterized by the pneumatic tire having a second cavity shape, the assembly further including a manual switch for determining whether the electromagnet is de-energized in the first condition or energized in the second condition.

2. The assembly as set forth in claim 1 wherein the metallic block is
a metallic ring having a rectangular cross-section and the electromagnet is an electromagnetic ring having a rectangular cross-section.

3. The assembly as set forth in claim 2 wherein the metallic ring and the electromagnetic ring both define continuous rings.

4. The assembly as set forth in claim 2 wherein the metallic ring is defined by a plurality of blocks spaced about the wheel to form a circular configuration.

5. The assembly as set forth in claim 4 wherein the electromagnetic ring is defined by a plurality of blocks spaced about the wheel to form a circular configuration.

6. An assembly for adjusting functional characteristics of the assembly, the assembly comprising:
a wheel for a vehicle;
a pneumatic tire mounted on the wheel;
a metallic block attached to the pneumatic tire; and
an electromagnet attached to the wheel,
the assembly having a first condition characterized by the metallic block and the electromagnet being not energized and a second condition characterized by the metallic block and the electromagnet being energized in a first manner such that the metallic block is attracted to the electromagnet when the electromagnet is energized, the first condition being characterized by a first footprint of the pneumatic tire with a shape different than a shape of a second footprint of the pneumatic tire in the second condition, the first condition being further characterized by the pneumatic tire having a first cavity shape, the second condition being further characterized by the pneumatic tire having a second cavity shape, the assembly having a third condition characterized by the first and second electromagnetic structures being energized in a second manner such that the metallic block is repelled by the electromagnet when the electromagnet is energized, the third condition being characterized by a third footprint of the pneumatic tire with a shape different than a shape of the first footprint in the first condition and different than the second footprint of the pneumatic tire in the second condition, the third condition being further characterized by the pneumatic tire having a third cavity shape, a manual switch for determining whether the electromagnet is de-energized in the first condition or energized in the second condition.

7. The assembly as set forth in claim 6 wherein the first footprint, the second footprint, and the third footprint are all a maximum ground area of contact of a tread of the pneumatic tire with a flat surface at zero speed and under a design load and pressure.

8. An assembly for adjusting functional characteristics of the assembly, the assembly comprising:
a wheel for a vehicle;
a pneumatic tire mounted on the wheel;
a metallic block attached to the pneumatic tire; and
an electromagnet attached to the wheel,
the assembly having a first condition characterized by the metallic block and the electromagnet being not energized and a second condition characterized by the metallic block and the electromagnet being energized in a first manner such that the metallic block is attracted to the electromagnet when the electromagnet is energized, the first condition being characterized by a first footprint of the pneumatic tire with a shape different than a shape of a second footprint of the pneumatic tire in the second condition, the first condition being further characterized by the pneumatic tire having a first cavity shape, the second condition being further characterized by the pneumatic tire having a second cavity shape, the assembly further includes a microprocessor for determining whether the electromagnet is de-energized in the first condition or energized in the second condition.

\* \* \* \* \*